(12) United States Patent
Mohaban et al.

(10) Patent No.: US 7,346,677 B1
(45) Date of Patent: Mar. 18, 2008

(54) METHOD AND APPARATUS FOR CREATING POLICIES FOR POLICY-BASED MANAGEMENT OF QUALITY OF SERVICE TREATMENTS OF NETWORK DATA TRAFFIC FLOWS

(75) Inventors: Shai Mohaban, Sunnyvale, CA (US); Steven M. Woo, Redwood Shores, CA (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 09/347,438

(22) Filed: Jul. 2, 1999

(51) Int. Cl.
*G06F 15/16* (2006.01)

(52) U.S. Cl. .................. 709/224; 709/232; 709/246; 709/223

(58) Field of Classification Search .............. 709/224, 709/232, 246, 223
See application file for complete search history.

(56) References Cited

U.S. PATENT DOCUMENTS

| | | | |
|---|---|---|---|
| 5,359,593 A | 10/1994 | Derby et al. | |
| 5,594,792 A | 1/1997 | Chouraki et al. | |
| 5,928,331 A | 7/1999 | Bushmitch | |
| 5,968,176 A | 10/1999 | Nessett et al. | |
| 5,970,064 A * | 10/1999 | Clark et al. | 370/242 |
| 6,009,081 A | 12/1999 | Wheeler et al. | |
| 6,021,263 A | 2/2000 | Kujoory et al. | |
| 6,021,439 A | 2/2000 | Turek et al. | 709/224 |
| 6,028,842 A * | 2/2000 | Chapman et al. | 370/235 |
| 6,046,980 A | 4/2000 | Packer | |
| 6,047,322 A | 4/2000 | Vaid et al. | |
| 6,061,725 A * | 5/2000 | Schwaller et al. | 709/224 |

(Continued)

OTHER PUBLICATIONS

S. Blake, et al., "Torrent Networking Technologies," Dec. 1998. pp. 1-36.

(Continued)

*Primary Examiner*—Ario Etienne
*Assistant Examiner*—Barbara Burgess
(74) *Attorney, Agent, or Firm*—Hickman Palermo Truong & Becker LLP

(57) ABSTRACT

A method and apparatus for creating policies for use in policy-based management of quality of service treatments of network data traffic flows are described. The policies are defined based on information about types of network traffic flows generated by an application program, and information about quality of service functions that are available in devices of the network. In one embodiment, application information is received that defines one or more traffic flows generated by an application program, including information identifying one or more points at which an application generates the traffic flows, from a first individual having responsibility for managing enterprise applications in the network. Further, QoS information is received that defines one of more quality of service treatments that the network device may apply to data processed by the network device, from a second individual having responsibility for managing the network. Based on the device QoS information and the application information, one or more processing policies that associate the traffic flows with the quality of service treatments are determined. Mappings of the application information to the quality of service treatments, which may be used to generate the quality of service value when the application program generates traffic flows, are created and stored. As a result, the policies are informed both by application program expertise and network expertise. Methods and mechanisms of integrating the policies into a directory are described.

43 Claims, 10 Drawing Sheets

U.S. PATENT DOCUMENTS

| | | | |
|---|---|---|---|
| 6,104,700 A * | 8/2000 | Haddock et al. ............. | 370/235 |
| 6,118,760 A | 9/2000 | Zaumen et al. ............. | 370/229 |
| 6,131,120 A | 10/2000 | Reid | |
| 6,154,776 A * | 11/2000 | Martin ........................ | 709/226 |
| 6,157,636 A | 12/2000 | Voit et al. | |
| 6,167,445 A | 12/2000 | Gai et al. | |
| 6,169,748 B1 | 1/2001 | Barbas et al. ............... | 370/468 |
| 6,170,009 B1 | 1/2001 | Mandal et al. | |
| 6,192,362 B1 | 2/2001 | Schneck et al. | |
| 6,212,184 B1 | 4/2001 | Venkatachary et al. | |
| 6,286,052 B1 * | 9/2001 | McCloghrie et al. ........ | 370/235 |
| 6,301,253 B1 | 10/2001 | Ichikawa .................... | 370/395 |
| 6,301,613 B1 | 10/2001 | Ahlstrom et al. ............ | 709/223 |
| 6,324,184 B1 | 11/2001 | Hou et al. | |
| 6,327,618 B1 | 12/2001 | Ahlstrom et al. ............ | 709/223 |
| 6,363,429 B1 | 3/2002 | Ketcham .................... | 709/235 |
| 6,393,473 B1 * | 5/2002 | Chu ............................ | 709/223 |
| 6,401,240 B1 | 6/2002 | Summers | |
| 6,424,659 B2 | 7/2002 | Viswanadham et al. | |
| 6,430,154 B1 * | 8/2002 | Hunt et al. ............... | 370/230.1 |
| 6,442,151 B1 | 8/2002 | H'mimy et al. | |
| 6,449,255 B1 | 9/2002 | Waclawsky | |
| 6,453,351 B1 | 9/2002 | Endo | |
| 6,459,682 B1 | 10/2002 | Ellesson et al. | |
| 6,463,470 B1 * | 10/2002 | Mohaban et al. ........... | 709/223 |
| 6,466,984 B1 * | 10/2002 | Naveh et al. ............... | 709/228 |
| 6,470,357 B1 | 10/2002 | Garcia et al. | |
| 6,473,793 B1 | 10/2002 | Dillon et al. | |
| 6,483,805 B1 | 11/2002 | Davies et al. | |
| 6,484,261 B1 | 11/2002 | Wiegel | |
| 6,490,589 B1 | 12/2002 | Weider et al. | |
| 6,498,612 B1 | 12/2002 | Brown et al. | |
| 6,539,425 B1 | 3/2003 | Stevens et al. | |
| 6,570,875 B1 | 5/2003 | Hegde | |
| 6,577,644 B1 | 6/2003 | Chuah et al. | |
| 6,581,093 B1 * | 6/2003 | Verma ........................ | 709/220 |
| 6,594,268 B1 | 7/2003 | Aukia et al. | |
| 6,601,082 B1 | 7/2003 | Durham et al. | |
| 6,611,864 B2 | 8/2003 | Putzolu et al. | |
| 6,621,793 B2 | 9/2003 | Widegreen et al. | |
| 6,622,170 B1 | 9/2003 | Harrison et al. | |
| 6,650,644 B1 * | 11/2003 | Colley et al. .......... | 370/395.21 |
| 6,651,191 B1 | 11/2003 | Vacante et al. | |
| 6,671,724 B1 | 12/2003 | Pandya et al. | |
| 6,684,244 B1 | 1/2004 | Goldman et al. | |
| 6,754,181 B1 | 6/2004 | Elliott et al. | |
| 6,765,873 B1 | 7/2004 | Fichou et al. | |
| 6,769,000 B1 | 7/2004 | Akhtar et al. | |

OTHER PUBLICATIONS

R. Braden, et al., "Resource ReSerVation Protosol (RSVP)—Version 1 Functional Specification," Sep. 1997, http://www.ietf.org/rfc/rfc2205.txt.?number=2205, printed Sep. 19, 2003, pp. 1-105.

D. Durham, et al., "The COPS (Common Open Policy Service) Protocol," Jan. 2000, pp. 1-38.

S. Herzog, et al., "COPS usage for RSVP," Jan. 2000, pp. 1-17.

* cited by examiner

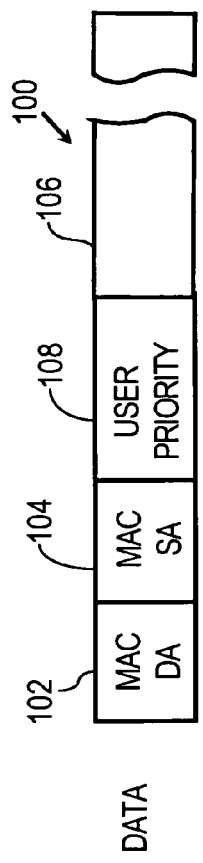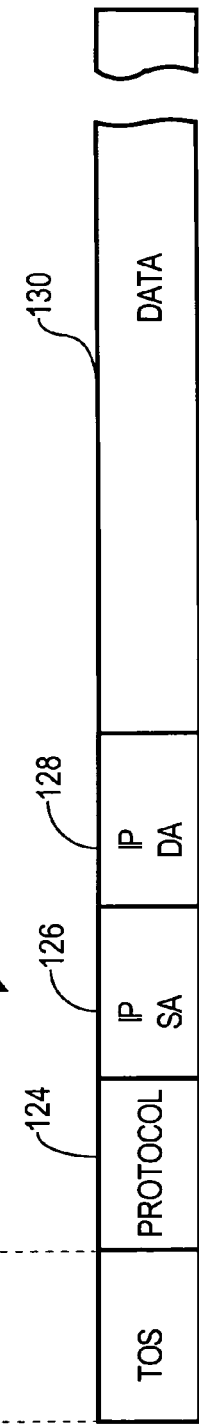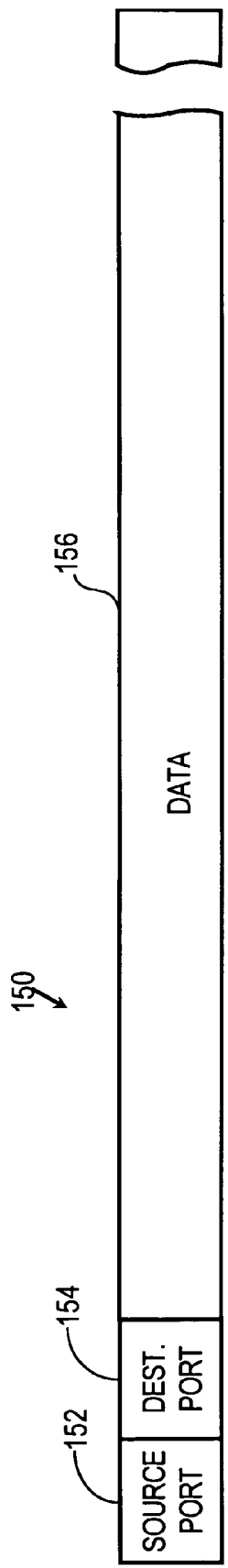
FIG. 1A (Prior Art)
FIG. 1B (Prior Art)
FIG. 1C (Prior Art)

METHOD AND APPARATUS FOR CREATING POLICIES FOR POLICY-BASED MANAGEMENT OF QUALITY OF SERVICE TREATMENTS OF NETWORK DATA TRAFFIC FLOWS

RELATED APPLICATIONS

This application is related to prior, co-pending application Ser. No. 09/179,036, filed Oct. 26, 1998, entitled "Method and apparatus for defining and implementing high-level quality of service policies in computer networks," and Ser. No. 09/206,067, filed Dec. 4, 1998, entitled "Method and apparatus for identifying network data traffic flows and for applying quality of service treatments to the flows."

FIELD OF THE INVENTION

The present invention relates generally to computer networks, and more specifically, to a method and apparatus for creating policies for policy-based management of quality of service treatments of network data traffic flows.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork knows as Internet.

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106. According to the 802.1Q standard, a user_priority field 108; among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet

120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet. Version 6 of the Internet Protocol (Ipv6) defines a traffic class field, which is also intended to be used for defining the type of service to be applied to the associated packet.

A working group of the Internet Engineering Task Force (IETF) has proposed replacing the ToS field 122 of Network Layer packets 120 with a one-octet differentiated services (DS) field 132 that can be loaded with a differentiated services codepoint. Layer 3 devices that are DS compliant apply a particular per-hop forwarding behavior to data packets based on the contents of their DS fields 132. Examples of per-hop forwarding behaviors include expedited forwarding and assured forwarding. The DS field 132 is typically loaded by DS compliant intermediate devices located at the border of a DS domain, which is a set of DS compliant intermediate devices under common network administration. Thereafter, interior DS compliant devices along the path apply the corresponding forwarding behavior to the packet 120.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

Service Level Agreements

To interconnect dispersed computer networks, many organizations rely on the infrastructure and facilities of Internet Service Providers (ISPs). For example, an organization may lease one or more T1 lines to interconnect various LANs. Each organization enters into a service-level agreement with its ISP. The service level agreements include one or more traffic specifications. The traffic specifications may place limits on the amount of resources that the organization may consume for a given price.

For example, an organization may agree not to send traffic that exceeds a certain bandwidth, e.g., 1 Mb/s. Traffic entering the service provider's network is monitored to ensure that it complies with the relevant traffic specifications and is thus "in profile." Traffic that exceeds a traffic specification, and is therefore "out of profile," may be dropped or shaped or may cause an accounting change. Alternatively, the service provider may mark the traffic as exceeding the traffic specification, but allow it to proceed through the network anyway. If there is congestion, an intermediate network device may drop such marked traffic first in an effort to relieve the congestion.

Multiple Traffic Flows

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Deficiencies of Past Approaches

Currently, application programs that execute in network devices rarely invoke QoS functions, and therefore they do not take full advantage of QoS features that are available in the network devices.

Some intermediate network devices can distinguish among multiple traffic flows and can apply different QoS to the flows. Generally, QoS may be applied by such network devices based on the IP address or port number associated with a traffic flow. This approach has several advantages. It is centralized, it works with multiple applications, and it is application independent. However, there are also significant disadvantages. It is based on limited or no knowledge of application traffic flows. A network manager cannot define and apply QoS policies for individual applications. It has only limited applicability to encrypted packets.

In another known approach, applications use QoS signaling mechanisms, such as RSVP or differentiated services ("DS" or "DiffServ"), to request a particular QoS for a particular traffic flow. In RSVP, a traffic flow passes a request for service that includes additional information to help a network device how to apply QoS. This approach can take advantage of detailed knowledge of different traffic flows produced by an application. However, there is no way to determine whether the RSVP requests comply with network-wide policies. The result is that the devices are often configured to ignore the signaling and treat all traffic equally.

Still another approach is IP precedence, in which a value is placed in a sub-field of the IP Type of Service field. This provides even less granular QoS control than DS.

Thus, current approaches do not adequately extend network device QoS features to multiple applications. These approaches do not integrate the application into the network and do not enable the application to classify its flows according to application-specific information. Further, there is no way to track applications that use dynamic port numbers, such as FTP.

Thus, there is a need for a mechanism that integrates applications into a policy-based networking system, and enables applications to participate in deciding how to apply a particular QoS to a traffic flow generated by the application.

Still another problem relates to how policies are defined. A typical business enterprise has separate individuals who are responsible for management of the enterprise's network and for installation and maintenance of application programs that run in or use the network. These individuals normally have greatly differing areas of knowledge and expertise. The network manager generally knows the configuration of the network in intimate detail and knows, or can determine, which network devices support various QoS services. However, the network manager generally does not know details about traffic flows that are generated by the application programs. In contrast, the application manager typically has extensive knowledge about the application programs and the kinds of traffic they generate, but less knowledge about the network, its devices, and their QoS capabilities. Accordingly, there is a need for a way to create network QoS policies that incorporate these respective bodies of knowledge in an orderly and integrated manner.

SUMMARY OF THE INVENTION

The foregoing objects and advantages, and other objects and advantages that will become apparent from the following description, are achieved by the present invention, which comprises, in one embodiment, a method and apparatus for creating policies for use in policy-based management of quality of service treatments of network data traffic flows. The policies are defined based on information about types of network traffic flows generated by an application program, and information about quality of service functions that are available in devices of the network.

In one embodiment, application information is received that defines one or more traffic flows generated by an application program, including information identifying one or more points at which an application generates the traffic flows, from a first individual having responsibility for managing enterprise applications in the network. Further, QoS information is received that defines one of more quality of service treatments that the network device may apply to data processed by the network device, from a second individual having responsibility for managing the network.

Based on the device QoS information and the application information, one or more processing policies that associate the traffic flows with the quality of service treatments are determined. Mappings of the application information to the quality of service treatments, which may be used to generate the quality of service value when the application program generates traffic flows, are created and stored. As a result, the policies are informed both by application program expertise and network expertise. Methods and mechanisms of integrating the policies into a directory are described.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a partial block diagram of a network message.
FIG. 1B is a partial block diagram of a network message.
FIG. 1C is a partial block diagram of a network message.

DETAILED DESCRIPTION OF THE PREFERRED EMBODIMENT

A method and apparatus for creating policies for use in policy-based management of quality of service treatments of network data traffic flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

1. Network

Figure 2:
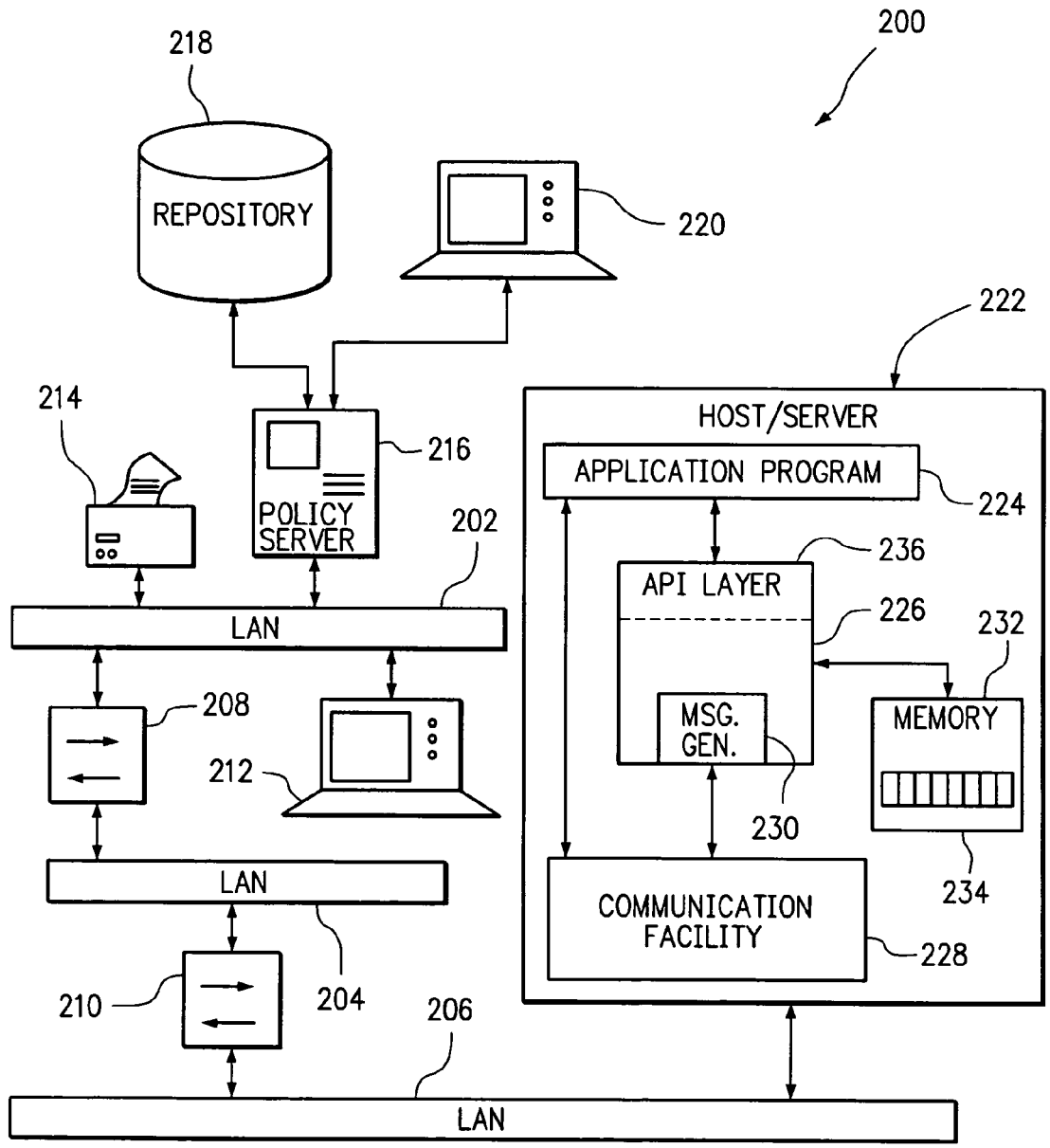
FIG. 2 is a simplified block diagram of a computer network.

An embodiment of the invention is used in the context of a network. FIG. 2 is a block diagram of a computer network 200 that includes a plurality of local area networks 202, 204, 206 interconnected by a plurality of intermediate network devices 208, 210. A plurality of network end stations, such as end station 212 and print server 214, are coupled to the LANs. The network further includes at least one policy server 216 that may be coupled to a repository 218 and to a network administrator station 220. A server suitable for use as policy server 216 is any Windows NT® or UNIX workstation or similar computer platform. Network 200 also includes at least one host or server 222 configured in accordance with the present invention.

Server 222 includes at least one application program or process 224, a flow declaration component 226 and a communication facility 228. The flow declaration component 226 includes a message generator 230 that communicates with the communication facility 228. Flow declaration component 226 also is coupled to an associated memory 232 for storing one or more traffic flow data structures 234. The application program 224 communicates with both communication facility 228 and, through application programming interface (API) layer 236, to flow declaration component 226. Communication facility 228, in turn, is connected to network 200 by LAN 206. The server 222 also comprises conventional programmable processing elements, which may contain software program instructions pertaining to the methods of the present invention. Other computer readable media may also be used to store the program instructions.

Communication facility 228 preferably includes one or more software libraries for implementing a communication protocol stack allowing server 222 to exchange messages with other network entities, such as end station 212, print server 214, etc. In particular, the communication facility 228 may include software layers corresponding to TCP/IP, Internet Packet Exchange (IPX) protocol, the AppleTalk protocol, the DECNet protocol and/or NetBIOS Extended User Interface (NetBEUI). Communication facility 228 further includes transmitting and receiving circuitry and components, including one or more network interface cards (NICs) that establish one or more physical ports to LAN 206 or other LANs for exchanging data packets and frames.

Intermediate network devices 208, 210 provide basic bridging functions including filtering of data traffic by MAC address, "learning" of a MAC address based upon a source MAC address of a frame, and forwarding of the frame based upon a destination MAC address or route information field (RIF). They may also include an IP software layer and provide route processing, path determination, and path switching functions. In one embodiment, devices 208, 210 are computers having transmitting and receiving circuitry and components, including network interface cards (NICs) establishing physical ports, for exchanging data frames. Intermediate network device 210, moreover, preferably is configured as a local policy enforcer for traffic flows originating from server 222, as described below.

Network 200 is illustrated as an example only. Embodiments disclosed in this document will operate with other, possibly far more complex, network topologies. For example, repository 218 and network administrator station 220 may be coupled directly or indirectly to policy server 216 through zero or more intermediate devices.

2. Local Policy Enforcer

Figure 3:
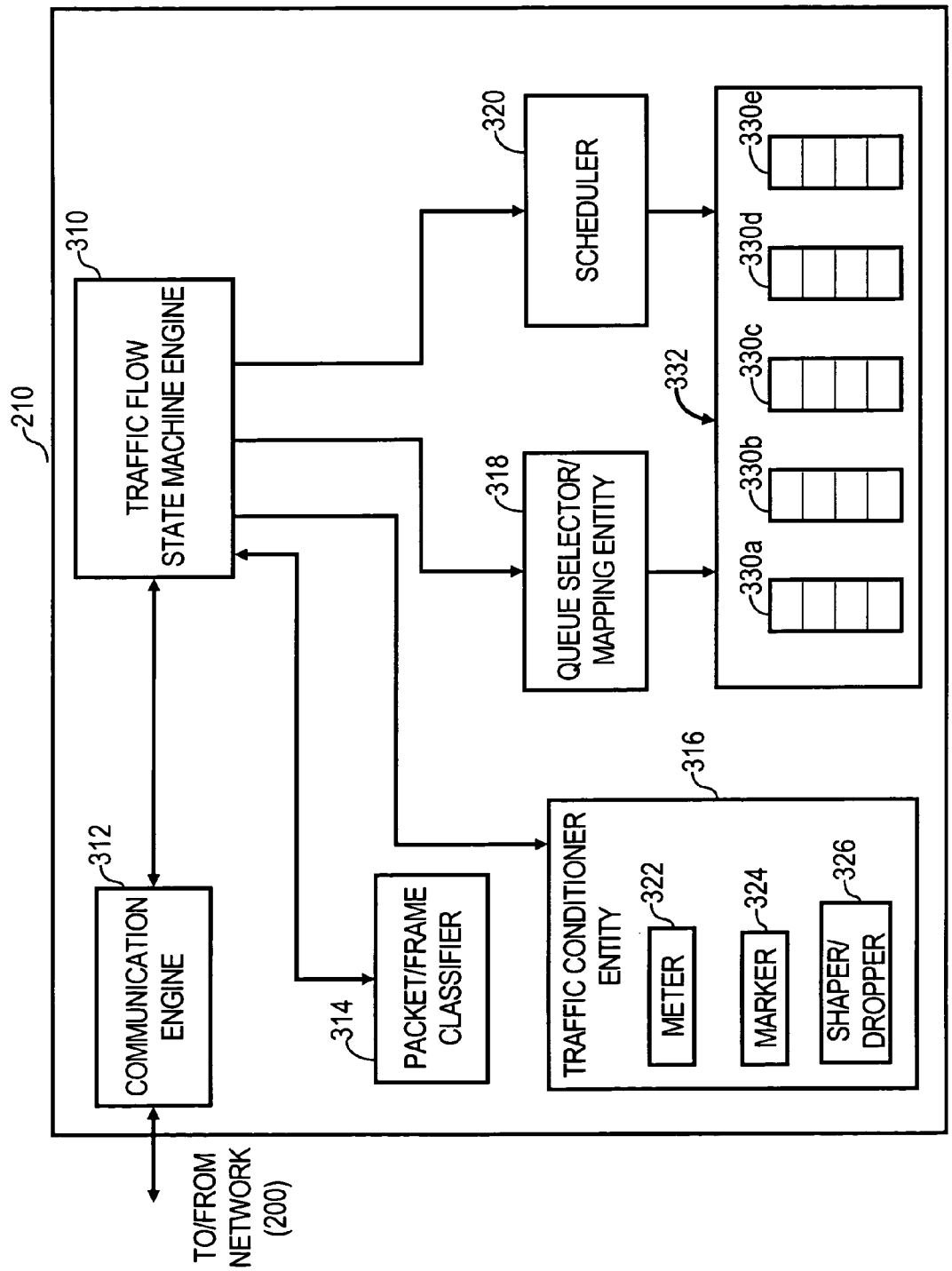
FIG. 3 is a simplified partial block diagram of a local policy enforcer.

FIG. 3 is a block diagram of local policy enforcer 210, which generally comprises a traffic flow state machine engine 310 for maintaining flow states corresponding to server 222 traffic flows, as described below. The traffic flow state machine engine 310 is coupled to a communication engine 312. Communication engine 312 is configured to formulated and exchange messages with the policy server 216 and flow declaration component 226 at server 222. Thus, communication engine 312 includes or has access to conventional circuitry for transmitting and receiving messages over network 200.

The traffic flow state machine engine 310 also is coupled to several traffic management resources and mechanisms. In particular, traffic flow state machine engine 310 is coupled to a packet/frame classifier 314, a traffic conditioner entity 316, a queue selector/mapping entity 318, and a scheduler 320. The traffic conditioner entity 316 includes several sub-components, including one or more metering entities 322, one or more marker entities 324, and one or more shaper/dropper entities 326. The queue selector/mapping entity 318 and scheduler 320 operate on the various queues established by local policy enforcer 210 for its ports and/or interfaces, such as queues 330a–330e corresponding to interface 332.

The term "intermediate network device" broadly means any intermediate device for interconnecting end stations of a computer network, including, without limitation, Layer 3 devices or routers as defined by RFC 1812; intermediate devices that are partially compliant with RFC 1812; intermediate devices that provide additional functions such as Virtual Local Area Network (VLAN) support; and Layer 2 intermediate devices such as switches and bridges, etc.

Policy System

1. Architecture

Figure 6A:
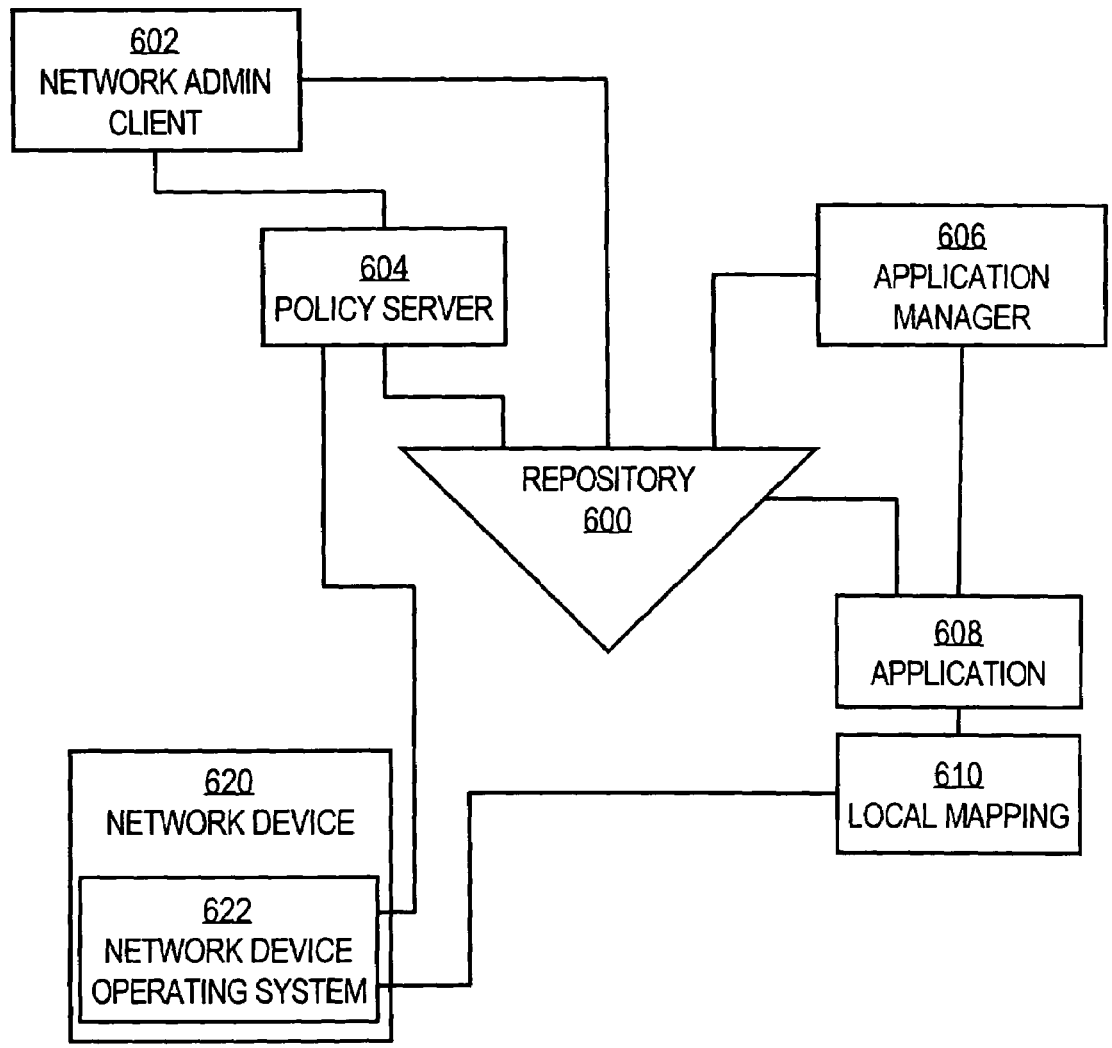
FIG. 6A is a block diagram of a system that provides policy-based QoS treatment for application traffic flows.

FIG. 6A is a block diagram of a system that provides policy-based QoS treatment for application traffic flows. Generally, the system of FIG. 6A comprises a Policy Server 604, a Repository 600, and an Application 608.

The Application 608 generally is an enterprise software application program that runs on a server computer. For example, Application 608 may comprise an Oracle® database system, a PeopleSoft® human resources system, or any other application. Application 608 is coupled to Repository 600 and to an Application Manager 606, the functions of which are described further below. Application 608 is also coupled to a Local Mapping 610, described below.

Repository 600 stores polices that are associated with applications. Repository 600 may comprise a directory server, such as Netware Directory Server, Windows Active Directory, etc., or a database. Advantageously, use of a Repository offers security. The format of the Repository is known only to a network vendor that supplies the Repository, or to a network administrator. Thus, only authorized applications may access the Repository.

A Schema stored in the Repository provides an integration point and a common information model for communication between Application 608 and Policy Server 604. Application 608 extends the Schema by adding application-specific parameters to it. The extended Schema describes the application and its specific parameters. For example, the Schema describes an Application Code Point and its possible values. When Application 608 is a Web server, the Schema describes a URL and its user name. Other examples of parameters include type of transaction; user identifier; application identifier; a text description; and others.

The application-specific parameters may be added manually, for example, using a schema definition file that is uploaded into the Repository 600. In another embodiment, the Repository 600 is a Directory Server compatible with Lightweight Directory Access Protocol (LDAP), and the application-specific parameters are added dynamically using LDAP. The precise mechanism for adding parameters is not critical. What is important is that each application contacts the Repository and declares one or more parameters that the application will use for classification of QoS of network devices that handle traffic flows generated by the application.

Policy Server 604 provides a mechanism by which a network administrator or may map application parameters into network services. A Network Administration Client 602 is coupled to Policy Server 604. A network administrator may use Network Administration Client 602 to communicate with Policy Server 604. Each network service defines how an application should access it. For example, access may comprise setting a DiffServ Code Point in the packets, by setting IP Precedence values in the packets, or by signaling using RSVP. An example of a commercial product suitable for use as Policy Server 604 is CiscoAssure QoS Policy Manager 1.0, commercially available from Cisco Systems, Inc.

Policy Server 604 is coupled to one or more network devices 620, each of which executes a network device operating system 622. An example of a network device 620 is a router and an example of a network device operating system 622 is IOS. Policy Server 604 configures the network devices 620 to implement the network services and to correctly respond to signaling from Application 608. For example, Policy Server 604 may map an Application Code Point to a DiffServ Code Point or IP precedence value. Such mappings of ACPs to DSCPs may be stored in Local Mapping 610 so that they are immediately accessible to Application 608 when it is executing in real time.

A mapping may apply for all application instances, for all application instances running on some subnet or on a single machine, or for a single instance identified by its IP address and source port number. The latter is useful, for example, when several Web servers are running on the same host. Thus, different mappings can be defined for the same Application Code Points, depending on the particular installation instance. The mapping translates single application QoS requirements into policies or requests that are centrally coordinated and in compliance with network-wide multi-application policies.

Figure 6B:
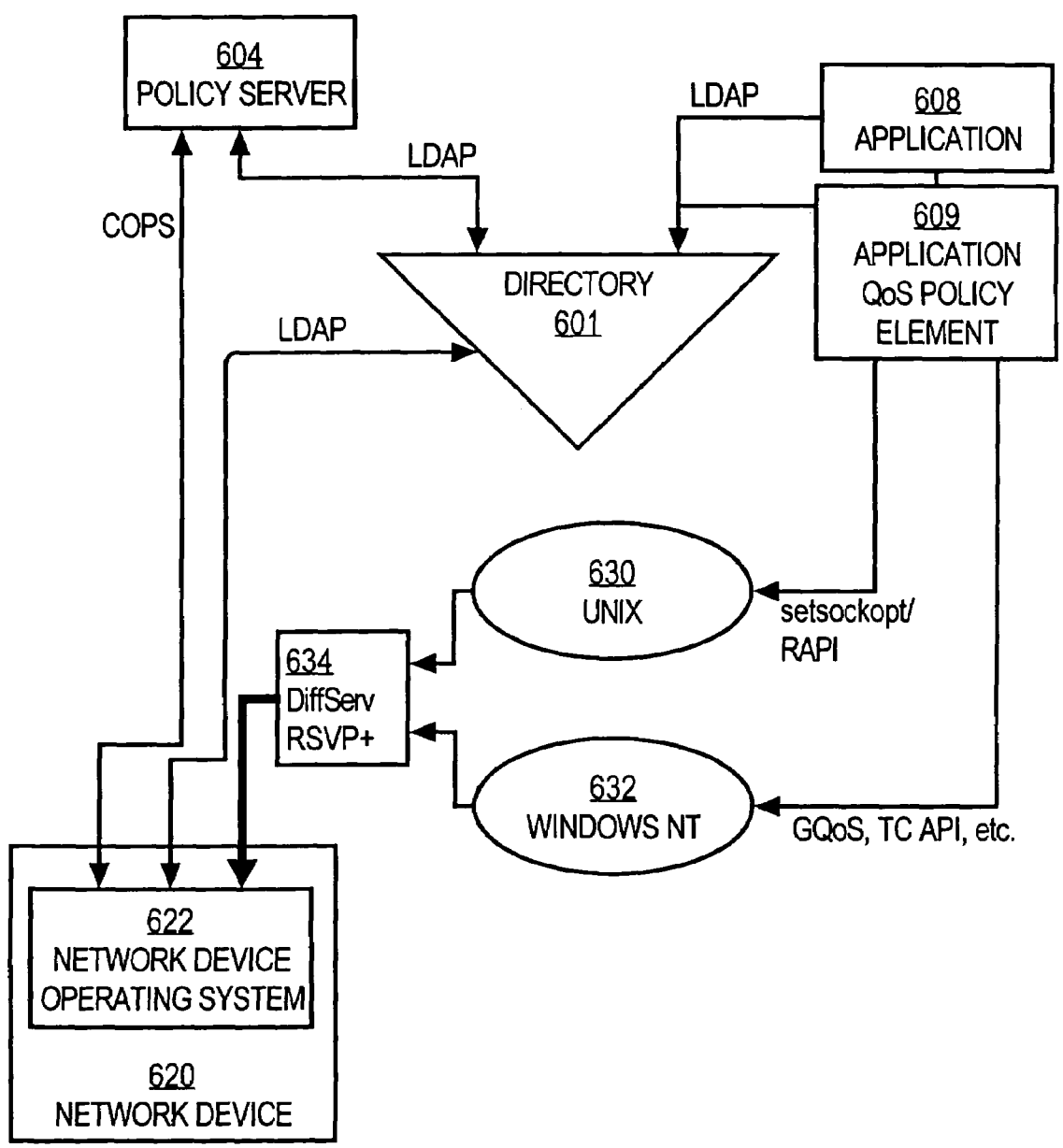
FIG. 6B is a block diagram of the system of FIG. 6A showing structures relating to multi-platform support.

FIG. 6B is a block diagram of the system of FIG. 6A showing architectural details that provide multi-platform support. As in FIG. 6A, Policy Server 604 and Application 608 are coupled to a repository, which in this embodiment is implemented in the form of an LDAP-compliant Directory 601. Policy Server 604 and Application 608 communicate with Directory 601 using LDAP function calls.

Application 608 is tightly coupled to or integrated with an application QoS policy element 609. In one embodiment, element 609 is one or more software programs, processes, or modules that can be linked to application 608 and called by the application. Element 609 implements the functions described herein including those of FIG. 7B. Element 609 may communicate with Directory 601 using LDAP calls.

Element 609 can set QoS services of a network device, for example, by setting DiffServ bits of packets of a flow of application 608, using functions of a UNIX operation system 630 and a Windows NT operating system 632. Any other operating system may be supported; UNIX and Windows NT are illustrated merely as examples. In one embodiment, element 609 selectively an alternatively calls the "setsockopt" function of UNIX, or the GqoS or TC APIs of Windows NT to set QoS bits of packets of a particular application flow. As a result, DiffServ or RSVP+ information is created, as indicated by block 634. The QoS information of block 634 is passed in packets of the flow to network device operating system 622. In response, network device 620 applies a desired QoS to the flow.

Advantageously, the architecture of FIG. 6B supports multiple platforms using APIs, provides policy integration using LDAP, and supports both DiffServ and RSVP+.

2. Operation of the System

Operation of the system of FIG. 6A or FIG. 6B generally comprises two phases: a configuration phase and an operation phase. The phases may execute in parallel.

Figure 7A:
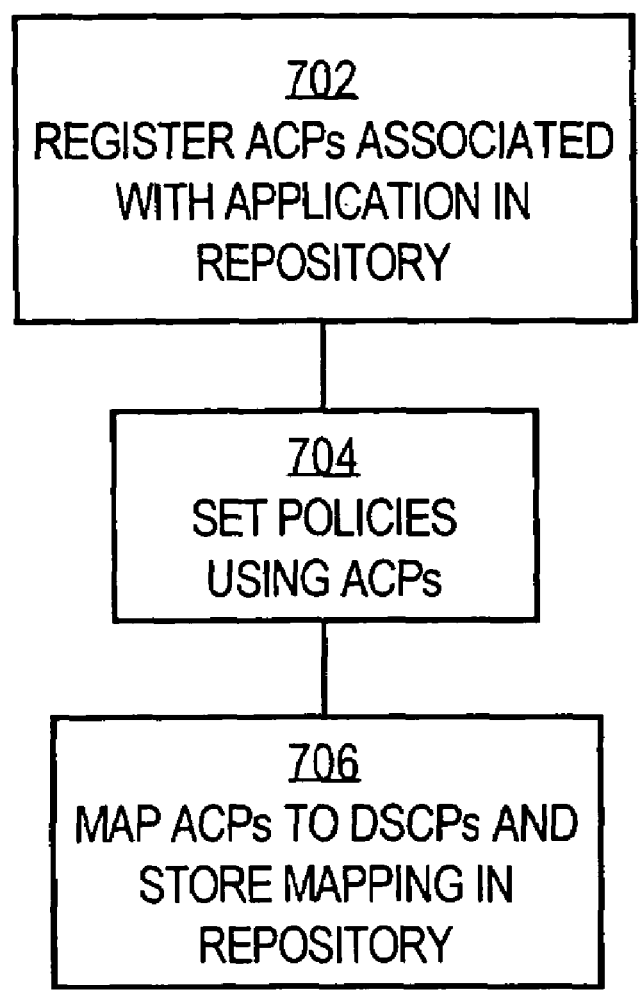
FIG. 7A is a flow diagram of steps of a configuration phase of operating the system of FIG. 6A and FIG. 6B.

FIG. 7A is a flow diagram of steps that may be carried out in the configuration phase. In block 702, ACPs associated with an application are registered in a repository. For example, Application 608 registers one or more Application Code Points in Repository 600. In one embodiment, Application 608 directly registers ACPs in Repository 600. Alternatively, Application Manager 606 receives information about traffic flows from Application 608, classifies the traffic flows into groups, maps the groups to ACPs, and registers the ACPs in Directory 600.

In block 704, policies are established based on the ACPs that are registered in association with the application. In one embodiment, Network Administration Client 602 or a network manager receives the ACP values. The network manager need not receive information about Application 608 or its traffic flows, however, the network manager or Network Administration Client 602 normally has extensive knowledge about managed devices in the network and the QoS services and features that they support. In response, the network manager establishes policies that associate conditions, operators, and the ACP values with actions or services of the devices. The policies may implement DiffServ or RSVP strategies. The policies may be stored in a storage device. Definition and storage of policies may be carried out using Policy Server 604.

In block 706, the ACPs are mapped to DiffServ Code Points and the resulting mapping is stored in a repository. For example, Policy Server 604 may use one or more LDAP calls to store mappings of ACP values to DSCP values in Repository 600. In the preferred embodiment, block 706 also involves automatically storing the mappings in a Local Mapping that is associated with and accessible to the application when it is executing.

Figure 7B:
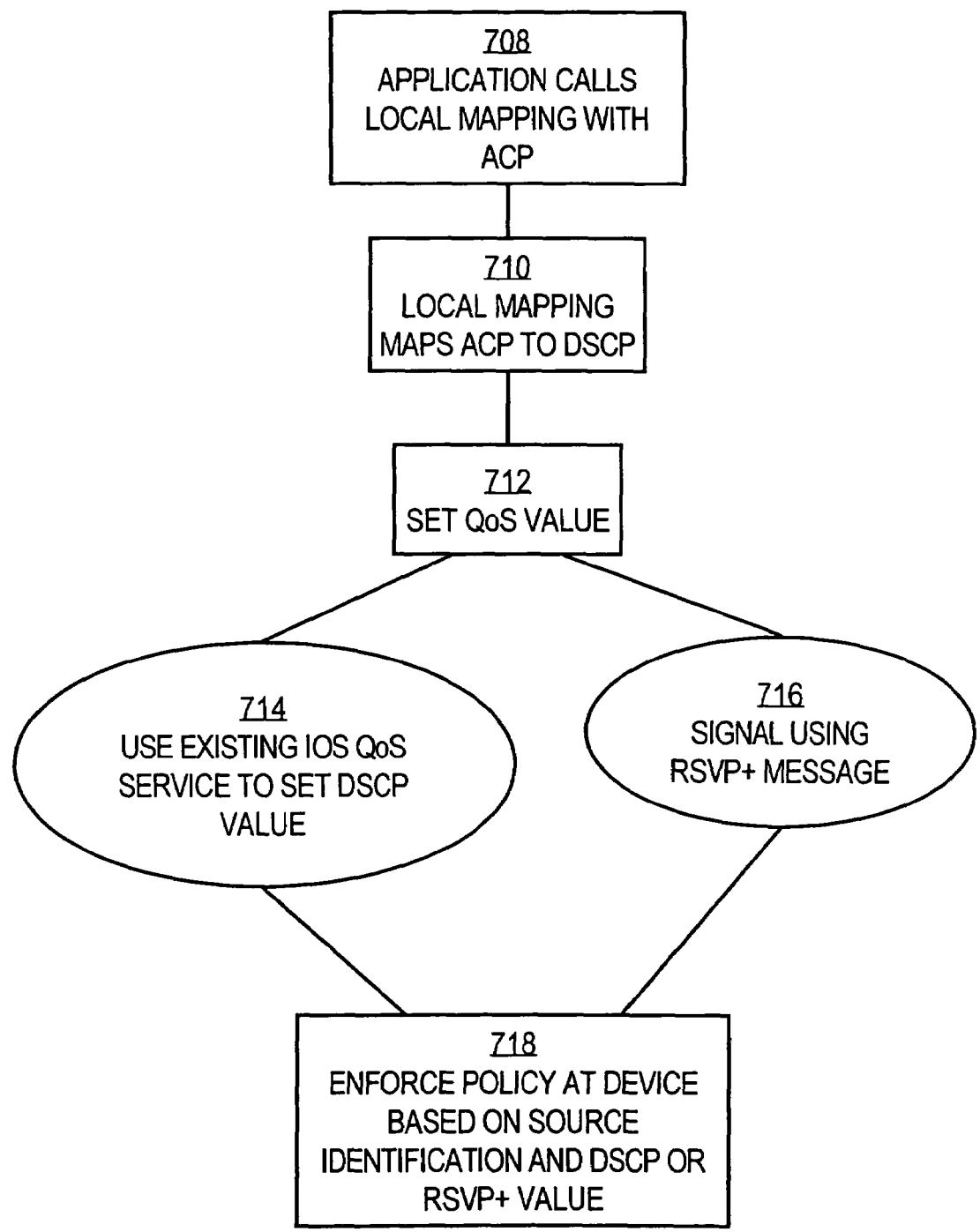
FIG. 7B is a flow diagram of steps of an active phase of operating the system of FIG. 6A and FIG. 6B.

FIG. 7B is a flow diagram of an active phase of operating the system. Application 608 executes. When an ACP is reached in execution of Application 608, the application calls its Local Mapping and passes it an ACP value associated with the current ACP, as shown by block 708. Alternatively, the application fetches mapping information from the Repository. When the Repository is an LDAP Directory, the application may use LDAP calls to fetch the information. In this embodiment, the application is modified or configured so that the application is LDAP-enabled, for example, by incorporating LDAP reference code or libraries.

Block 708 may also involve the steps of processing the information received from the Repository for efficient lookup. In another embodiment, block 708 involves polling the Repository for policy changes that are stored in the Repository after the mapping information is retrieved. Further, block 708 may involve listening for notification of policy changes.

For each flow generated by the application, this information is then used to map the application parameters attached to the flow into a concrete QoS decision and a signaling mechanism. For example, the process is notified by the application about the start of each flow, with its parameters, and this information is converted into QoS information usable by a network device. The simplest case is mapping one ACP into a DSCP value, as shown by block 710, and then setting a QoS value of packets of the flow, as shown by block 712. For example, a QoS value may be set by marking the flow packets using an appropriate operating system call to an existing QoS service, as shown by block 714.

Alternatively, if the mapping information cannot be obtained or refreshed from the policy Repository, the application reverts to a backup mode of signaling the policy information itself, such as an ACP value, to the network device, e.g., using RSVP+, as shown by block 716. Thus, for short-lived flows, packets may be colored, whereas for long-lived flows, separate out-of-band messages may be used to establish QoS.

Standard APIs provided by the network operating system are used to signal the network. For example, GQoS or RAPI may be used for RSVP signaling. The APIs "GqoS" and "setsockopt" of IOS may be used for DiffServ or IP Precedence marking.

The application and the policy system may use event services, such as CNS, to publish and subscribe to event notifications regarding policy changes. Upon such events the application should download and use the new policies. Alternatively, the application can poll the policy repository.

In block 718, the policy is enforced at a network device, based on information identifying the source of the packet and the DSCP or RSVP+ value associated with the packet. In one embodiment, a service of IOS enforces the policy based on the values.

The selection of DiffServ or RSVP+ as a policy enforcement mechanism is a matter of network policy. DiffServ is integrated in the network using the Repository described herein, with the defined Schema and LDAP for communications, and can handle all sessions, including short-lived flows. RSVP+ is integrated using a network device that supports RSVP+. It enables signaling QoS information from non-core or third-party applications, and is well suited for use with non-trusted hosts. Typically, DiffServ is preferred if the application supports it, and RSVP+ is a default mechanism.

3. User Model

Using the system and process described above, network applications may request network QoS based on application-specific parameters. A network manager maps the application-specific parameters into concrete network services.

However, this approach requires the network manager to be familiar with the application-specific parameters and what they mean. Some applications are complex, such as Enterprise Resource Planning ("ERP") applications, and require deep knowledge and expertise to operate properly. The network manager may not have such expertise. Normally such expertise resides with an application manager or information technology manager of the organization that is using the application.

Figure 4:
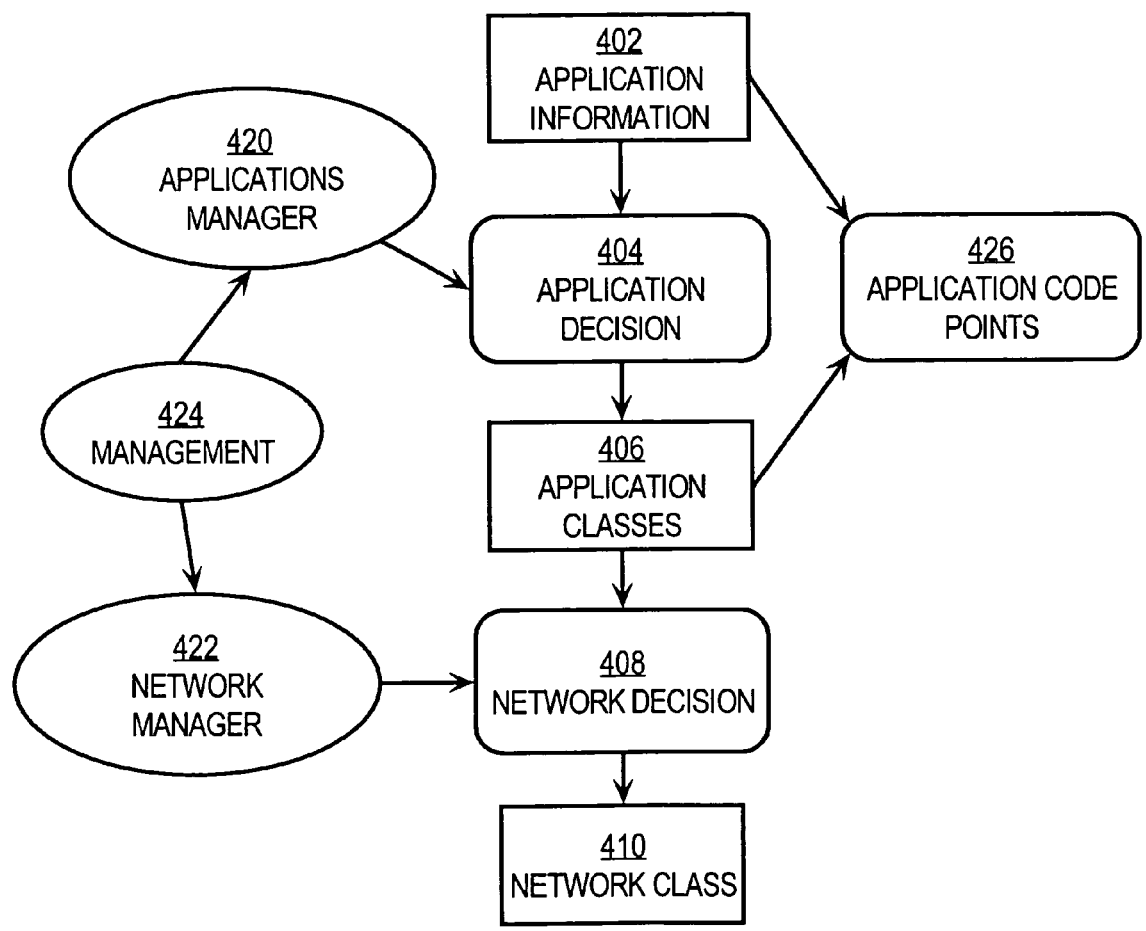
FIG. 4 is a block diagram of a process of determining application quality of service information.

FIG. 4 is a block diagram of a process of determining application-specific network QoS information. The process of FIG. 4 partitions decision-making about application QoS among an applications manager 420 and a network manager 422 in a manner that allows distributed decision-making yet is simple for the network manager to control.

Applications manager 420 is an individual who has expertise operating a particular application. Examples of applications include databases, ERP applications, sales force automation applications, human resources applications, etc. Applications manager 420 receives extensive application information 402 that defines, among other things, the types of network messages, traffic and flows that are generated by the application in operation. Applications manager 420 makes an application decision 404, resulting in creating one or more application classes 406 that categorize the messages, traffic and flows into a smaller number of groups. For example, application information 402 might inform applications manager 420 that a particular application generates eight (8) different kinds of log and warning error messages. The applications manager may decide to classify all such messages as "medium" priority traffic.

The mapping of application information to application classes may be represented by creating and storing one or more Application Codepoints (ACPs) 426. Thus, the application pre-defines a set of application classes or Application Codepoints 426. The ACPs identify and define one or more types of traffic flows or classes that are produced by an application. ACPs may define application flows in a static manner, for example, according to intrinsic application parameters. For example, one ACP value may be associated with all traffic generated by a specific application module. Another ACP may identify batch traffic, and another may identify transactional traffic.

Table 1 provides one example of a mapping of ACPs to priority descriptions.

TABLE 1

| ACP | DESCRIPTION |
|---|---|
| 1 | HIGH PRIORITY |
| 2 | MEDIUM PRIORITY |
| 3 | NORMAL PRIORITY |
| 4 | LOW PRIORITY |

Table 2 provides another example of a mapping of ACPs to application traffic flow descriptions.

TABLE 2

| ACP | DESCRIPTION |
|---|---|
| 1 | FINANCE TRANSACTION |
| 2 | FINANCE REPORTING |
| 3 | HR TRANSACTION |
| 4 | HR REPORTING |

Sequential ACP values are shown in Table 1 and Table 2, however, an ACP may have any value, according to any order. Any number of ACP values may be defined. The number of ACPs that are defined depends upon the level of detail ("granularity") of control that is desired for traffic flows of an application.

To establish ACPs 426 for an application, an application manager 420 may edit a configuration file that maps ACP values to application flows. For example, application manager 420 could be a Webmaster who prepares a configuration file that maps URLs and users into pre-defined application classes such as High, Medium, and Low.

Network manager 422 is an individual having expertise in configuring, operating, and maintaining a network, such as network 200 of FIG. 2. Network manager 422 receives the application classes 406 and, based on the network manager's accumulated expertise in network operations, makes a network decision 408 that maps each of the application classes 406 into one or more network classes 410. The network classes 420 represent a mapping of a specific QoS for the network, typically in terms of DSCPs or RSVP+ messages. For example, the network manager 422 may decide to map the High class of traffic to DSCP "52."

Table 3 is an example of a mapping of ACP values to policy values.

TABLE 3

| ACP VALUE | DSCP VALUE |
|---|---|
| 1 | 50 |
| 2 | 32 |
| 3 | 32 |
| 4 | 24 |

Preferably, such mappings are stored in the Repository in the manner described in this document. The mappings may be created and stored using an external application program. Preferably, the program creates and stores a default policy value, e.g., a default DSCP value, when no mapping is created for a particular ACP value. This simplifies the mapping process.

Both network manager 422 and applications manager 420 may be influenced by external management 424 and its policies and procedures.

In operation, the application consults with the policy system in order to complete the mapping from the ACPs into network services, for example, into DSCP values. Generally, such mapping is stored in the Repository. The policy manager uses the policy system to store the mappings in the Repository, and an application uses an access protocol such as LDAP to retrieve a mapping from the Repository.

In one embodiment, the mapping from ACPs to network services is communicated between applications manager 420 and network manager 422 using a Service Level Agreement. The applications manager and network manager may be associated with different enterprises. Advantageously, applications manager 420 only needs to prepare a mapping of an application function into an ACP and may ignore details of the network services that are used to achieve a particular QoS. Further, network manager 422 only needs to prepare a mapping of ACPs to network services and need not know or consider the application functions that are handled.

As a result, network manager 422 considers only groups or classes of application traffic flow and need not know or consider a much larger set of application functions that fall into such groups or classes. Minimizing the number of ACPs will optimize the local policy matching process. Further, flexibility and granularity in decision-making are supported, because the application manager 420 may consider all application parameters and permutations before determining application policies. Accordingly, application managers may participate in the decision process pertaining to QoS for applications. A network administrator may control even the most complicated applications, which might involve many application-specific parameters and require extensive application-specific expertise.

4. Information Model

In an embodiment, the Repository stores one or more Policy Statements. Each Policy Statement applies to a specific application, and may be specific to a logical instance of the application. It describes a condition and a network service to be applied for traffic matching that condition. A Policy Statement may comprise a general Boolean expression of its underlying policy conditions.

Each condition describes a subset of traffic flows of the application. Each condition comprises basic condition components. Each basic condition comprises a basic policy parameter identifier, an operator and an operand. Policy identifiers may be application-specific. Each policy identifier has a pre-defined type such as string, integer, or enumerated value. For example, a policy identifier may be "URL"; an operator may be "contains"; and an operand may be "www.cisco.com".

A plurality of global, pre-defined Policy Identifiers are stored. Pre-defined Policy Identifiers include source and destination IP address, source and destination port numbers, protocol, application identifier, and ACP. Application-specific policy identifiers are added to the Repository manually, or by a configuration file provided by the application, or by program calls using standard protocols such as LDAP.

Figure 5:
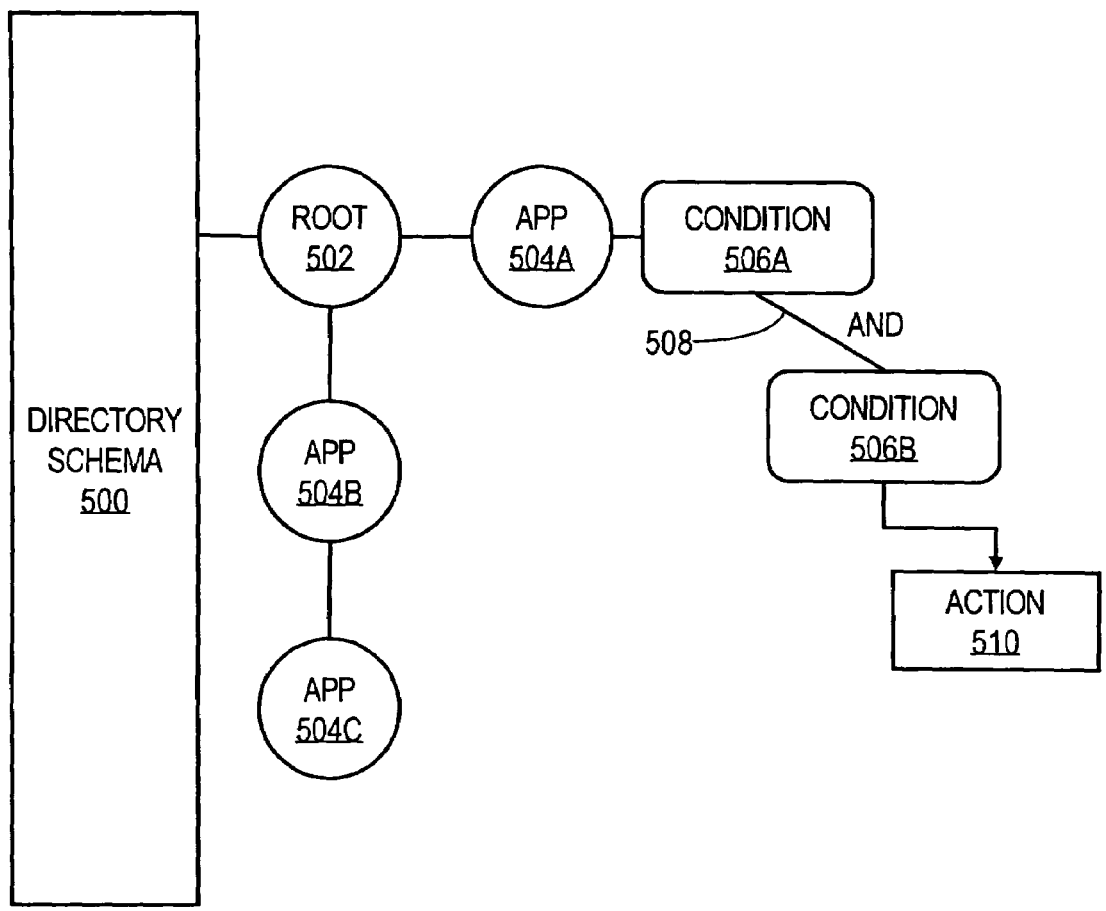
FIG. 5 is a block diagram of a portion of a Repository that contains a Directory Schema.

FIG. 5 is a block diagram of a portion of a Repository that contains a Directory Schema 500. The Directory Schema 500 may represent the topology of a managed network or other directory information useful in network management. A Root node 502 is coupled to Directory Schema 500. In this context, "Root" means that node 502 is the topmost node for a set of nodes that represent Policy Statements. The Root node 502 may have a Distinguished Name in the Directory Schema 500 of the type defined in the International Telecommunications Union (ITU) X.400 standard.

As shown in FIG. 5, Root node 502 is coupled to a plurality of Application nodes 504A, 504B, 504C. There may be any number of Application nodes. Each Application node represents a particular application program that is used in the managed network. Child nodes of an Application node represent policies that are associated with that application.

Each Policy Statement in the Repository comprises stored information that represents a condition and an action involved in the policy. For example, Application node 504A is coupled to two Condition nodes 506A, 506B. Each condition comprises a parameter, an operator, and an operand. For example, a parameter may be a range of ACP values, or one or more URL statements that contain strings. Each operator is a comparison such as equal to, greater than, less than, in range, etc. Each condition evaluates to a Boolean value.

Conditions are joined by Boolean operators. For example, Condition node 506A is coupled to Condition node 506B by an AND operator 508. There may be any number of Condition nodes and any number of operators.

The Repository is associated with a list of network services that are implemented by the system. The list of services stores abstract definitions of services that are later translated into a specific configuration of a network device. Examples of services include delay, guaranteed bandwidth, a queuing type on a router interface, etc. The services in the list also define signaling mechanisms that may be used for accessing the service, for example, by using a specific DSCP or IP Precedence value.

Each Policy Statement terminates in an Action. For example, Condition nodes 506A, 506B terminate at Action node 510. Each Action node represents an action to apply to network devices when an associated application generates a traffic flow such that the Policy Statement evaluates to TRUE. An Action node may store information that indicates, for example, that network devices must service the flow using DSCP or IPP.

The Repository may be implemented in the form of a Directory Server, in a database, or using one or more files expressed in an Interface Definition Language (IDL).

Hardware Overview

Figure 8:
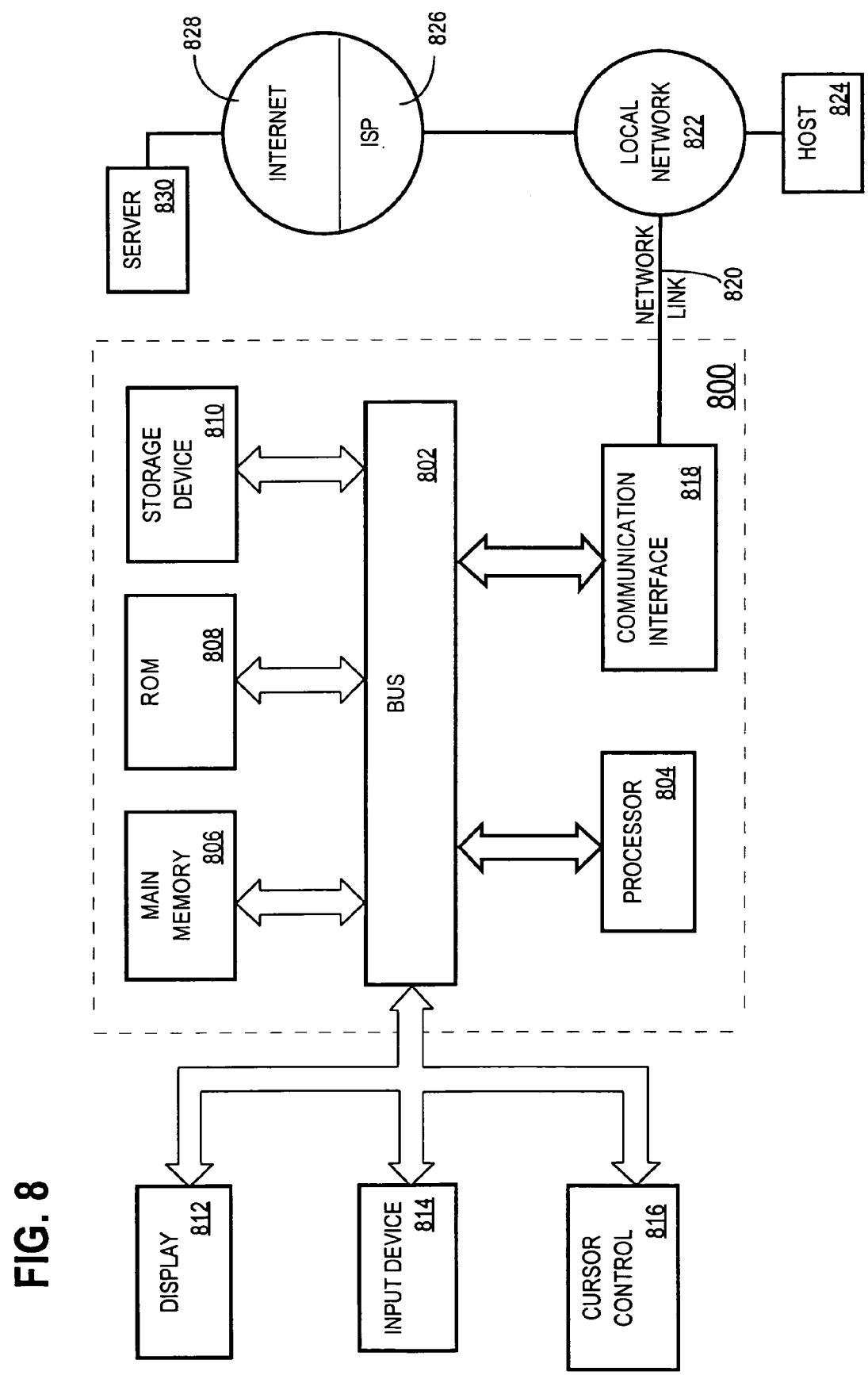
FIG. 8 is a block diagram of a computer system with which an embodiment may be carried out.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for creating policies for use in policy-based management of quality of service treatments of network data traffic flows. According to one embodiment of the invention, creating policies for use in policy-based management of quality of service treatments of network data traffic flows is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such medium may take many forms, including but not limited to storage media and transmission media. Storage media includes, for example, optical or magnetic disks, such as storage device 810. Storage media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for creating policies for use in policy-based management of quality of service treatments of network data traffic flows as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selectively establishing a quality of service value for a particular network device in a network that comprises a plurality of other heterogeneous network devices, comprising the steps of:

receiving application information that defines one or more traffic flows associated with one or more message types generated by an application program, including information identifying one or more points at which the application generates the traffic flows;

receiving device information that defines one or more quality of service treatments that the particular network device may apply to data processed by the particular network device;

based on the device information and the application information, determining one or more processing policies that associate the traffic flows with the quality of service treatments;

creating and storing one or more mappings of the application points to the quality of service treatments that may be used with the processing policies to generate the quality of service value when the application program generates traffic flows of one of the message types;

causing generation of the quality of service value, wherein the generation of the quality of service value is based on said one or more mappings and is performed before transmitting said traffic flows of one of the message types to said network;

enforcing one of the processing policies at the particular network device in response to receiving traffic from the application program that matches one of the traffic flows of the one of the messages types; and wherein enforcing one of the processing policies comprises:

requesting, using an application QoS policy element that is coupled to the application program, an operating system function to modify a packet of the traffic flows using a policy element that requests a different operating system function according to an operating system then in use; and at the particular network device, in response to receiving traffic from the application program that matches the one of the traffic flows of the one of the message types and in response to the operating system function, modifying a portion of the packet to activate a quality of service treatment of the particular network device.

2. A method as recited in claim 1, further comprising:
storing the mappings in a repository that is accessible by the application program;
storing both the application information and the device information in the repository; and
converting the mappings into one or more settings of the particular network device.

3. A method as recited in claim 2, wherein creating and storing one or more mappings comprises creating and storing one or more policies, concerning network processing of traffic flows generated by the application program, in the repository.

4. A method as recited in claim 2, wherein creating and storing one or more mappings comprises creating and storing one or more policies, concerning network processing of traffic flows generated by the application program, in a policy store that is coupled to the repository.

5. A method as recited in claim 2, wherein creating and storing one or more mappings comprises creating and storing one or more policies, concerning network processing of traffic flows generated by the application program, in a policy server coupled to a Lightweight Directory Access Protocol directory that comprises the repository.

6. A method as recited in claim 2, wherein creating and storing one or more mappings further comprises creating and storing, in the repository, one or more mappings of Application Code Points of the application program to one or more Differential Services Code Points of a protocol associated with the particular network device.

7. A method as recited in claim 1, further comprising:
creating and storing one or more classes that classify the traffic flows, each of the classes associated with one or more of the message types;
based on the device information and the classes of the traffic flows, determining one or more processing policies that associate the traffic flows with the quality of service treatments.

8. A method as recited in claim 1, wherein receiving application information comprises receiving one or more application code points that represent traffic flow types.

9. A method as recited in claim 1, wherein creating and storing one or more mappings comprises creating and storing one or more policies, concerning network processing of traffic flows generated by the application program, in a directory.

10. A method as recited in claim 1, wherein creating and storing one or more mappings further comprises generating one or more messages in RSVP+( ) and communicating the messages to the particular network device.

11. A method as recited in claim 1, wherein receiving application information comprises receiving application information that defines one or more traffic flows generated by the application program, including information identifying one or more points at which the application generates the traffic flows, from a first individual having responsibility for managing enterprise applications in the network, and not from one having responsibility for managing the network.

12. A method as recited in claim 11, wherein receiving device information comprises receiving device information that defines one or more of the quality of service treatments that the particular network device may apply to data processed by the particular network device, from a second individual having responsibility for managing the network.

13. A method as recited in claim 1, wherein determining one or more processing policies comprises creating and storing one or more policy statements in a repository, wherein each policy statement associates a condition of one of the traffic flows, an operator, an operand, and an action comprising one of the quality of service treatments.

14. A method as recited in claim 1, wherein determining one or more processing policies comprises creating and storing one or more policy statements in a repository, wherein each policy statement is represented by a plurality of nodes that represent a condition of one of the traffic flows, an operator, an operand, and an action comprising one of the quality of service treatments.

15. A method as recited in claim 1, wherein determining one or more processing policies comprises creating and storing one or more policy statements in a directory, wherein each policy statement is represented by a plurality of nodes that represent a condition of one of the traffic flows, an operator, an operand, and an action comprising one of the quality of service treatments, and wherein the plurality of nodes is coupled to a root node having a distinguished name in the directory.

16. A method as recited in claim 1, wherein each of the mappings comprises an application code point value stored in associated with a differentiated services code point value.

17. A method of selectively establishing a quality of service value treatment for network traffic passing through a particular device in a data network that comprises a plurality of other heterogeneous network devices, according to an application program that generates the network traffic, comprising the steps of:
receiving application information that defines one or more traffic flows associated with one or more message types generated by the application program, including one or more application codepoints at which the application program generates the traffic flows;
receiving device information that defines one or more quality of service treatments that the particular network device is capable of applying to data processed by the particular network device;
based on the device information and the application information, determining one or more processing policies that associate the traffic flows with the quality of service treatments;
creating and storing one or more mappings of the application codepoints to the quality of service treatments that may be used with the processing policies to generate the quality of service value when the application program generates traffic flows of one of the message types;
storing the mappings in a repository that is accessible by the application program;
converting the mappings into one or more messages to the particular network device that instruct the particular network device to apply Differentiated Services quality of service treatment in response to receiving traffic from the application program that matches the traffic flows;
wherein the step of converting the mappings is performed before transmitting said traffic flows of one of the message types to said network;
enforcing one of the processing policies at the particular network device in response to receiving traffic from the application program that matches the traffic flows of the one of the message types; and wherein enforcing one of the processing policies comprises:
  requesting, using an application QoS policy element that is coupled to the application program, an operating system function to modify a packet of the traffic flows using a policy element that requests a different operating system function according to an operating system then in use; and
  at the particular network device, in response to receiving traffic from the application program that matches one of the traffic flows of the one of the message types and in response to the operating system function, modifying a portion of the packet to activate a quality of service treatment of the particular network device.

18. A method of selectively establishing a quality of service value for a particular network device in a network that comprises a plurality of other heterogeneous network devices, comprising the steps of:
  receiving application information that defines one or more traffic flows associated with one or more message types generated by an application program, including information identifying one or more points at which the application program generates the traffic flows;
  receiving device QoS information that defines one or more quality of service treatments that the particular network device may apply to data processed by the particular network device;
  based on the device QoS information and the application information, determining one or more processing policies that associate the traffic flows with the quality of service treatments;
  creating and storing one or more mappings of the application points to the quality of service treatments that may be used with the processing policies to generate the quality of service value when the application program generates traffic flows for one of the message types;
  causing generation of the quality of service value, wherein the generation of the quality of service value is based on said one or more mappings and is performed before transmitting said traffic flows of one of the message types to said network;
  enforcing one of the processing policies at the particular network device in response to receiving traffic from the application program that matches the one of the flows of the one of the message types; and
  wherein enforcing one of the processing policies comprises:
    requesting, using an application QoS policy element that is coupled to the application program, an operating system function to modify a packet of the traffic flows using a policy element that requests a different operating system function according to an operating system then in use; and
    at the particular network device, in response to receiving traffic from the application program that matches the one of the traffic flows of the one of the message types and in response to the operating system function, modifying a portion of the packet to activate a quality of service treatment of the particular network device.

19. A computer-readable storage medium carrying one or more sequences of instructions which, when executed by one or more processors, cause the one or more processors to selectively establish a quality of service value for a particular network device in a network that comprises a plurality of other heterogeneous network devices, by carrying out the steps of:
  receiving application information that defines one or more traffic flows associated with one or more message types generated by the application program, including information identifying one or more points at which the application generates the traffic flows;
  receiving device information that defines one or more quality of service treatments that the particular network device may apply to data processed by the particular network device;
  based on the device information and the application information, determining one or more processing policies that associate the traffic flows with the quality of service treatments;
  creating and storing one or more mappings of the application points to the quality of service treatments that may be used with the processing policies to generate the quality of service value when the application program generates traffic flows for one of the message types;
  causing generation of the quality of service value, wherein the generation of the quality of service value is based on said one or more mappings and is performed before transmitting said traffic flows of one of the message types to said network;
  enforcing one of the processing policies at the particular network device in response to receiving traffic from the application program that matches one of the traffic flows of the one of the message types; and
  wherein enforcing one of the processing policies comprises:
    requesting, using an application QoS policy element that is coupled to the application program, an operating system function to modify a packet of the traffic flows using a policy element that requests a different operating system function according to an operating system then in use; and
    at the particular network device, in response to receiving traffic from the application program that matches the one of the traffic flows of the one of the message types and in response to the operating system function, modifying a portion of the packet to activate a quality of service treatment of the particular network device.

20. A computer-readable storage medium as recited in claim 19, further comprising instructions for carrying out the steps of:
  storing the mappings in a repository that is accessible by the application program;
  storing both the application information and the device information in the repository; and
  converting the mappings into one or more settings of the particular network device.

21. A computer-readable storage medium as recited in claim 20, further comprising instructions for carrying out the steps of creating and storing one or more mappings by creating and storing one or more policies, concerning network processing of traffic flows generated by the application program, in the repository.

22. A computer-readable storage medium as recited in claim 20, further comprising instructions for carrying out the steps of creating and storing one or more mappings by creating and storing one or more policies, concerning network processing of traffic flows generated by the application program, in a policy server coupled to a Lightweight Directory Access Protocol directory that comprises the repository.

23. A computer-readable storage medium as recited in claim 20, further comprising instructions for carrying out the steps of creating and storing one or more mappings by creating and storing, in the repository, one or more mappings of Application Code Points of the application program to one or more Differential Services Code Points of a protocol associated with the particular network device.

24. A computer-readable storage medium as recited in claim 19, further comprising instructions for carrying out the steps of:
   creating and storing one or more classes that classify the traffic flows, each of the classes associated with one or more of the message types;
   based on the device information and the classes of the traffic flows, determining one or more processing policies that associate the traffic flows with the quality of service treatments.

25. A computer-readable storage medium as recited in claim 19, further comprising instructions for carrying out the steps of determining one or more processing policies by creating and storing one or more policy statements in a repository, wherein each policy statement associates a condition of one of the traffic flows, an operator, an operand, and an action comprising one of the quality of service treatments.

26. A computer-readable storage medium as recited in claim 1, further comprising instructions for determining one or more processing policies by creating and storing one or more policy statements in a directory, wherein each policy statement is represented by a plurality of nodes that represent a condition of one of the traffic flows, and operator, an operand, and an action comprising one of the quality of service treatments, and wherein the plurality of nodes is coupled to a root node having a distinguished name in the directory.

27. A method of selectively establishing a quality of service value for a particular network device in a network that comprises a plurality of other heterogeneous network devices, comprising the steps of:
   receiving and storing, in a directory server, application information that defines one or more traffic flows for one or more message types generated by an application program, including information identifying one or more code points at which the application program generates the traffic flows;
   receiving and storing, in the directory server, device information that defines one or more quality of service treatments that the particular network device may apply to data processed by the particular network device;
   based on the device information and the application information, creating and storing a first policy mapping that associates the traffic flows with the quality of service treatments; and
   creating and storing a second mapping of the application code points to the quality of service treatments that may be used with the first policy mapping to generate the quality of service value when the application program generates traffic flows for one of the message types;
   causing generation of the quality of service value, wherein the generation of the quality of service value is based on said mappings and is performed before transmitting said traffic flows of one of the message types to said network;
   enforcing processing policies at the particular network device in response to receiving traffic from the application program that matches the one or more of the traffic flows of the one of the message types; and
   wherein enforcing the processing policies comprises:
      requesting, using an application QoS policy element that is coupled to the application program, an operating system function to modify a packet of the traffic flows using a policy element that requests a different operating system function according to an operating system then in use; and
      at the particular network device, in response to receiving traffic from the application program that matches the one or more of the traffic flows of the one of the message types and in response to the operating system function, modifying a portion of the packet to activate a quality of service treatment of the particular network device.

28. An apparatus for selectively establishing a quality of service value for a particular network device in a network that comprises a plurality of other heterogeneous network devices, comprising:
   a network interface that is communicatively coupled to the network for receiving packet flows therefrom;
   one or more processors; and
   a computer-readable medium carrying one or more sequences of instructions which, when executed by the one or more processors, cause the one or more processors to selectively establish a quality of service value for a particular network device in a network that comprises a plurality of other heterogeneous network devices, by carrying out:
   receiving application information that defines one or more traffic flows associated with one or more message types generated by an application program, including information identifying one or more points at which the application generates the traffic flows;
   receiving device information that defines one or more quality of service treatments that the particular network device may apply to data processed by the particular network device;
   based on the device information and the application information, determining one or more processing policies that associate the traffic flows with the quality of service treatments;
   creating and storing one or more mappings of the application points to the quality of service treatments that may be used with the processing policies to generate the quality of service value when the application program generates traffic flows of one of the message types;
   causing generation of the quality of service value, wherein the generation of the quality of service value is based on said one or more mappings and is performed before transmitting said traffic flows of one of the message types to said network;
   enforcing one of the processing policies at the particular network device in response to receiving traffic from the application program that matches the one or more of the traffic flows of the one of the message types; and
   wherein enforcing one of the processing policies comprises:
      requesting, using an application QoS policy element that is coupled to the application program, an operating system function to modify a packet of the traffic flows using a policy element that requests a different operating system function according to an operating system then in use; and
      at the particular network device, in response to receiving traffic from the application program that matches the one or more of the traffic flows of the one of the message types and in response to the operating system function, modifying a portion of the packet to activate a quality of service treatment of the particular network device.

29. An apparatus as recited in claim 28, further comprising one or more sequences of instructions which, when executed by the one or more processors, cause the one or more processors to perform:
storing the mappings in a repository that is accessible by the application program;
storing both the application information and the device information in the repository; and
converting the mappings into one or more settings of the particular network device.

30. An apparatus as recited in claim 29, wherein the instructions for creating and storing one or more mappings comprise instructions for creating and storing one or more policies, concerning network processing of traffic flows generated by the application program, in the repository.

31. An apparatus as recited in claim 29, wherein the instructions for creating and storing one or more mappings comprise instructions for creating and storing one or more policies, concerning network processing of traffic flows generated by the application program, in a policy store that is coupled to the repository.

32. An apparatus as recited in claim 29, wherein the instructions for creating and storing one or more mappings comprise instructions for creating and storing one or more policies, concerning network processing of traffic flows generated by the application program, in a policy server coupled to a Lightweight Directory Access Protocol directory that comprises the repository.

33. An apparatus as recited in claim 29, wherein the instructions for creating and storing one or more mappings further comprise instructions for creating and storing, in the repository, one or more mappings of Application Code Points of the application program to one or more Differential Services Code Points of a protocol associated with the particular network device.

34. An apparatus as recited in claim 28, further comprising one or more sequences of instructions which, when executed by the one or more processors, cause the one or more processors to perform:
creating and storing one or more classes that classify the traffic flows, each of the classes associated with one or more of the message types;
based on the device information and the classes of the traffic flows, determining one or more processing policies that associate the traffic flows with the quality of service treatments.

35. An apparatus as recited in claim 28, wherein the instructions for receiving application information comprise instructions for receiving one or more application code points that represent traffic flow types.

36. An apparatus as recited in claim 28, wherein the instructions for creating and storing one or more mappings comprise instructions for creating and storing one or more policies, concerning network processing of traffic flows generated by the application program, in a directory.

37. An apparatus as recited in claim 28, wherein the instructions for creating and storing one or more mappings further comprise instructions for generating one or more messages in RSVP+ () and communicating the messages to the particular network device.

38. An apparatus as recited in claim 28, wherein the instructions for receiving application information comprise receiving application information that defines one or more traffic flows generated by the application program, including information identifying one or more points at which the application generates the traffic flows, from a first individual having responsibility for managing enterprise applications in the network, and not from one having responsibility for managing the network.

39. An apparatus as recited in claim 38, wherein the instructions for receiving device information comprise instructions for receiving device information that defines one or more of the quality of service treatments that the particular network device may apply to data processed by the particular network device, from a second individual having responsibility for managing the network.

40. An apparatus as recited in claim 28, wherein the instructions for determining one or more processing policies comprise instructions for creating and storing one or more policy statements in a repository, wherein each policy statement associates a condition of one of the traffic flows, an operator, an operand, and an action comprising one of the quality of service treatments.

41. An apparatus as recited in claim 28, wherein the instructions for determining one or more processing policies comprises instructions for creating and storing one or more policy statements in a repository, wherein each policy statement is represented by a plurality of nodes that represent a condition of one of the traffic flows, an operator, an operand, and an action comprising one of the quality of service treatments.

42. An apparatus as recited in claim 28, wherein the instructions for determining one or more processing policies comprise instructions for creating and storing one or more policy statements in a directory, wherein each policy statement is represented by a plurality of nodes that represent a condition of one of the traffic flows, an operator, an operand, and an action comprising one of the quality of service treatments, and wherein the plurality of nodes is coupled to a root node having a distinguished name in the directory.

43. A method as recited in claim 28, wherein each of the mappings comprises an application code point value stored in associated with a differentiated services code point value.

* * * * *